United States Patent Office 3,206,315
Patented Sept. 14, 1965

3,206,315
METHOD OF MAKING MARSHMALLOW
Paul P. Anderson, Dearborn, and Adolf Busemann, Detroit, Mich., assignors, by mesne assignments, to American Agricultural Chemical Company, a corporation of Delaware
No Drawing. Filed Dec. 3, 1962, Ser. No. 241,538
6 Claims. (Cl. 99—134)

This invention relates to confectionery products of the character commonly known as marshmallow, and to the preparation thereof. In a more particular sense, the invention is directed to a novel whipping agent for marshmallow, and to marshmallow products incorporating such whipping agent and procedure for making the same.

According to present commercial practice, marshmallow is prepared by whipping a mixture containing sucrose, corn syrup, and water, together with a minor proportion of a suitable whipping agent (e.g. less than 2% by weight), to reduce the density of the mixture by inclusion of small air bubbles and thereby to produce an air-expanded, edible product desirably of low density and tender consistency. The whipping agent is included to produce and stabilize the foamy or air-expanded marshmallow structure. Conventionally, a substantially pure high-quality gelatin has been employed for this purpose; thus, by way of example, a typical marshmallow mixture as heretofore prepared includes the following ingredients:

| | Percent |
|---|---|
| Gelatin (250 bloom) | 1.8 |
| Water | 22.0 |
| Sucrose | 45.72 |
| Corn Syrup | 30.48 |

It has now been found that marshmallow of advantageously superior quality, and having important additional advantages with respect to ease and economy of preparation, can be produced by using as the whipping agent (e.g. in the proportion indicated above) a mixture of gelatin and so-called gelatin residue hydrolysate, in place of the pure gelatin heretofore employed. The gelatin residue hydrolysate is obtained by hydrolyzing the residue remaining after removal of gelatin from collagenous materials such as animal hides, e.g. in conventional gelatin manufacturing operations. In accordance with the present inventon, this hydrolysis of the residue is carried forward in the presence of a suitable acid or alkali, and the pH of the resulted hydrolysate liquor is adjusted to a value between 3 and 7. The produced hydrolysate liquor, i.e. solution, which may if desired be concentrated by evaporation under vacuum, is blended with gelatin solution to produce a whipping agent for marshmallow. The proportions of the solutions are selected to provide the desired hydrolysate-gelatin ratio as explained below, e.g. so that the mixture of hydrolysate and gelatin, considered as solids and measured by weight, contains between about 5% and about 50% hydrolysate.

When the hydrolysate-containing whipping agent of the present invention is used in a marshmallow mixture, the whipping time required to reduce the density of the mixture to a given desired value is found to be significantly shorter than when a pure gelatin whipping agent is employed. The improvement is marked, even in comparison with gelatin of 250 bloom value, which whips relatively fast. Such decrease in whipping time is of especial importance for batch-type commercial marshmallow manufacturing operations, wherein the volume of production is inversely dependent upon the whipping time required for each batch of marshmallow mixture. Furthermore, since the hydrolysate constituent of the present whipping agent is prepared from a waste residue of gelatin production, the latter whipping agent is less expensive than a pure gelatin whipping agent. In addition, the marshmallow product incorporating the hydrolysate-gelatin whipping agent is more tender than that containing pure gelatin as a whipping agent, as specifically evidenced by its superior shortness (i.e. less stretching of the marshmallow is required to break it), and also has greater viscosity or body and improved freedom from stringing or lumping; these latter qualities advantageously facilitate handling of the whipped marshmallow, e.g. in the preparation of various confections therefrom. Thus the novel marshmallow product of the present invention is both more economical to prepare and better in quality than the pure gelatin-whipping agent product heretofore known.

The gelatin residue from which the aforementioned hydrolysate is prepared may be defined as the residue of collagenous gelatin-precursor materials remaining after such materials have been treated, e.g. with lime or acid, and cooked with water to effect removal of collagen therefrom in the form of gelatin. Gelatin is conventionally produced from collagen-containing materials such as bone matter, pigskin (herein referred to as hides), and beefskin or calfskin (herein referred to as splits). By way of example, in the production of gelatin from bone matter using the lime process, the bone matter, e.g. after preliminary acidulation with dilute hydrochloric acid (to demineralize the bone), is conditioned by immersion in a slurry containing 5% by weight lime, or a succession of such lime slurries, for a period of from 30 to 100 days. The lime-treated bone matter is then soaked in acid, e.g. for 3 or 4 days to remove the lime therefrom, after which this bone matter is subjected to a succession of cooking operations wherein it is immersed in water and heated in steps from 120° F. to 212° F. In this cooking process, collagen, a constituent of bone, hydrolyzes to gelatin; the solution is drained periodically from the cooking vessel and further treated to effect recovery fo the extracted gelatin. A variant process may be exemplified by the treatment of splits with caustic, followed by cooking in water to remove the gelatin, which is, again, carried with the water from the cooking operation.

In the production of gelatin from hides using the acid process, the hides are acidulated with a solution of 2% to 2.25% hydrochloric or sulfuric acid for a period of e.g. 12 to 16 hours, with circulation of the acid solution. Thereafter the hides are washed with water until the acid concentration of the water as removed from the hides is reduced to about 0.1%; the hides are then cooked with water in successive stages wherein the temperature is raised from 120° F. to 200° F., with a six hours cycle in each stage. The gelatin is thereby removed from the hides, and carried away in solution in the water from the cooking stages for further treatment and concentration.

It will be appreciated that each of the foregoing processes is applicable to the production of gelatin from any of the aforementioned collagenous materials; thus, for instance, gelatin may be produced from hides by the lime process, or from bone by the acid process. Whatever collagneous material is used, the final step of gelatin removal in each of these processes is effected by cooking the pretreated material in hot water. The gelatin is removed in solution in the water, leaving a residue of the precursor material. This residue constitutes the starting material of the present invention. Since very little residue remains after such cooking of bone matter, the invention will be particularly described as using the residue of other precursor materials, e.g. hides.

Such so-called gelatin residue, i.e. the material remaining after acid- or lime-treated hides or splits have been cooked with water to effect removal of gelatin therefrom, typically contains about 24% solids, and is essentially non-collagenous in character since substantially all collagen has been removed as gelatin in the cooking operations. A sample of such residue of hides, after drying at 100° F., was found on analysis to have the following compositon:

Moisture _____ 8.7%.
Fat _____ 34.4%.
Protein _____ 50.5%.
Ash _____ less than 0.1%.
Other (predominantly carbohydrates) _ 6.3%.

It is presently believed that the protein content is high in keratin, for the reason that gelatin raw materials (such as used herein, e.g. hides or splits) contain considerable amounts of keratin and collagen, and most of the collagen is converted to gelatin during extraction of the latter.

In preparing this gelatin residue for treatment according to the present invention, it has been found desirable to remove fats therefrom, and preferably to a considerable extent before hydrolysing the residue. The removal of fats may be accomplished in any suitable manner for separation or extraction of fats. For example, fats may be partially removed from the gelatin residue, after the last gelatin extraction, by boiling with hot water for about six hours, and then introducing additional hot water at the bottom of the cooker, with the result that the lower density fats rise and flow off the top or may be skimmed therefrom. Very preferably, as much fat as possible is removed in this manner, it being understood that in preferred practice of instances of the invention as described below, the above treatment for fat separation is effected before the residue is hydrolysed. Remaining fats form insoluble soaps with the lime or equivalent agent, e.g. as employed for or with the hydrolysing operation, and are removed as undissolved material by straining or like operation, for example when the hydrolysed liquor is strained as mentioned below.

With such gelatin residue, the process of the present invention, according to presently preferred practice, is carried forward (e.g. after removal of fats as mentioned above) by hydrolysing the residue with water and a minor proportion of acid or alkali at an elevated temperature for a period of at least several hours. The particular acid or alkali employed is desirably selected to yield a low ash content in the produced hydrolysate; i.e. the ion used for hydrolysing should be readily removable, after the hydrolysis operation is completed, by precipitation as an insoluble salt. Alkali materials suitable for such use include in general the hydroxides of alkali metals and alkaline earth metals, which will yield varying amounts of ash depending upon how completely the particular ion involved can be precipitated as an insoluble salt.

A particularly effective material for the hydrolysis is lime, used in a proportion of about 2% to about 5% by weight based on the amount of residue to be treated; if less than 2% of lime is used, the yield of hydrolysate decreases. Greater amounts of lime, i.e. above 5%, produce satisfactory hydrolysates, but according to present observations do not appreciably improve yield or quality. Alternately, a mixture of lime and sodium hydroxide in a proportion of 0.25% to 4% by weight (again based on the amount of residue to be treated) may be employed; with this mixture a somewhat higher yield of hydrolysate is achieved but the hydrolysate contains up to 25% ash. Such product (having a considerable ash content due to sodium ions) may be less desirable where a low ash value is required, but its whipping properties are entirely satisfactory. An example of an acid suitable for use in the hydrolysis of gelatin residue according to the present process is sulfuric acid, in a proportion between about 2% and about 10% by weight based on the amount of residue to be treated. When such acid is used, it is found that the best yield is achieved if the proportion of acid used is about 10% by weight.

To effect the hydrolysis, the gelatin residue and the acid or alkali to be employed, e.g. in the proportions above indicated, are admixed with a substantial quantity of water, for example in the proportion of 60 parts by weight of water for each 100 parts by weight of gelatin residue, and heated for a protracted period. Specifically, in a preferred way of carrying out the present process, the residue, water, and acid or alkali are maintained at a temperature above 190° F. (conveniently in the range of 190° F. to 210° F., or at higher temperatures under superatmospheric pressure) for a period of between 6 and 18 hours. It is found that the yield of hydrolysate increases with increasing time of cooking or hydrolysis. Shorter times may be used when the batch is heated under pressure; for instance, autoclaving at 260° F. for 7 hours has produced a satisfactory hydrolysate with yield and quality equal to the result of a cook more than twice as long at 210° F. At the end of the period of hydrolysing treatment, the water-residue mixture constitutes a gelatin residue hydrolysate liquor containing between 4 and 6 pounds of dissolved hydrolysate solids for each 100 pounds of gelatin residue treated, together with a proportion of undissolved waste solids which may be removed by straining.

After straining, the hydrolysate liquor is treated to adjust the pH to a value between 3 and 7, it being presently preferred to achieve a pH between 3.5 and 6.0. The agent used to effect such pH adjustment is selected to neutralize the ion used for hydrolysing and specifically to remove such ion from the liquor by precipitation in the form of an insoluble salt so as to reduce the ash content of the hydrolysate. For example, if lime is used in effecting the hydrolysis, the pH adjustment may be effected with sulfuric or phosphoric acid and as a result of such pH adjustment the calcium ion in the hydrolysate liquor is precipitated out in the form of calcium sulfate or calcium phosphate. If sulfuric acid is used for the hydrolysis, lime is employed to effect the pH adjustment, and the sulfate ion is precipitated out as calcium sulfate.

After such pH adjustment is effected and the precipitated salt is removed, e.g. in a filtering operation of conventional character, the hydrolysate is ready to be used in solution or liquor form, after concentration if desired, for mixture with gelatin (conveniently in solution) to constitute a whipping agent for marshmallow. Desirably, the produced hydrolysate need not be concentrated to dryness and then redissolved; these are not only unnecessary steps, but it has been found that drying produces insolubles or impairs the solubility of the hydrolysate. Accordingly, the mixture of gelatin and hydrolysate is conveniently effected by wet blending, namely blending the hydrolysate solution with gelatin liquor, for example using 250 bloom gelatin. Although drying is unnecessary, it may be advantageous to reduce the water content of the hydrolysate or the whipping agent before use; for instance, prior to mixing with gelatin, the hydrolysate liquor can be concentrated to 40% by evaporation under vacuum. The relative proportions of gelatin and hydrolysate mixed are selected to provide a whipping agent containing e.g. between 5% and 50% hydrolysate solids and between 95% and 50% gelatin, by weight.

Tests have indicated that the present invention affords improvement in whipping properties with respect to gelatins of a considerable range of quality, for instance from 175 to 300 bloom, but better stability has been attained, and generally best results, with gelatins in the higher part of this range, e.g. 250; hence the latter are presently preferred for use with the hydrolysate to constitute the whipping agent.

In the preparation of a typical marshmallow product with this hydrolysate-containing whipping agent, a sugar or a mixture of sugars such as sucrose and corn syrup in a ratio of about 6 parts of sucrose to 4 parts of corn syrup are mixed with water at an elevated temperature (e.g. about 145° F.) to form a syrup. A quantity of the whipping agent is blended with this syrup to provide a marshmallow mixture containing corn syrup and sucrose together with e.g. about 22% water by weight and usually between about 1.5% and about 2% (e.g. 1.8%), or sometimes up to about 2.25%, of the hydrolysate-containing whipping agent by weight. The latter mixture is then whipped, in a suitable beater or other appropriate whipping device, in accordance with conventional marshmallow whipping procedure, until the desired density is obtained.

The following specific examples will serve to illustrate further the procedures and products of the present invention:

*Example I*

100 pounds of gelatin residue containing 24% solids, and constituting the residue of hides remaining after acid treatment and cooking with water to remove gelatin therefrom, were mixed with 3.5 pounds of lime and 60 pounds of water and cooked in such mixture for 14 hours at 210° F. At the end of the cooking period, undissolved solids were removed by straining and the pH of the remaining hydrolysate liquor was adjusted to 5.1 by addition of phosphoric acid, which formed a precipitate of calcium phosphate with the calcium ion in the liquor; after settling, the precipitate was removed by filtering the liquor through a conventional Niagara filter using filter aid. The filtered liquor was found on analysis to contain 5.44% dissolved hydrolysate solids.

Quantities of the hydrolysate thus produced were wet-blended with high quality (250 bloom) gelatin (by mixing hydrolysate solution with gelatin solution) in varying proportions to provide a series of marshmallow whipping agents. Marshmallow mixtures were then prepared from these whipping agents; for purposes of comparison an otherwise-identical marshmallow mixture having a pure gelatin whipping agent was also prepared. Preparation of the marshmallow mixtures in each case involved establishing a whipping agent solution consisting of 22 grams of whipping agent solids and 170 grams of water, prepared by mixing solutions as above, or for the standard of comparison, by taking gelatin to constitute the total solids. To the extent necessary for dissolving the gelatin, the gelatin solution or the entire solution was heated to about 140°–145° F. The procedure of making the marshmallow mix also involved mixing 388 grams of corn syrup and 463 grams of sucrose in 128 grams of water and heating to about 145° F., and slowly blending the whipping agent solution and this sugar solution together until the temperature of the mixed solutions dropped to about 113° F.

Each mixture was then whipped with a rapid beating action (e.g. in apparatus of conventional type, suitable for marshmallow preparation) for a period of 3½ minutes. The densities of the marshmallow products obtained were found to be as follows:

| Whipping Agent | | Net Weight per Pint, grams |
|---|---|---|
| Percent gelatin | Percent hydrolysate | |
| 100 | 0 | 253 |
| 95 | 5 | 241 |
| 90 | 10 | 233 |
| 80 | 20 | 198 |

As indicated in the above table, the marshmallows containing hydrolysate-gelatin whipping agent were of desirable lower density than the marshmallow prepared with a pure gelatin whipping agent after whipping for an equal time. As also appears, the density of the marshmallow product was inversely proportional to the percent of hydrolysate solids present in the whipping agent.

*Example II*

Using gelatin residue hydrolysate prepared as before, two marshmallow mixtures were formed according to the procedures and with the amounts of sucrose, corn syrup, water and whipping agent set forth in Example I above. In the first mixture, a very fast whipping gelatin was used as the whipping agent. In the second mixture, a whipping agent containing 60% gelatin and 40% hydrolysate solids was used. Each of these mixtures was first whipped for a period of 2½ minutes, and a test for density of each batch was made. Then the two batches were whipped for an additional minute, making a total whipping time of 3½ minutes, and the density was again measured. The following are the densities found for the treatment periods noted above.

| Whipping Agent Used | Net Weight Per Pint, 2½ minute Whip, grams | Net Weight Per Pint, 3½ minute Whip, grams |
|---|---|---|
| Pure Gelatin | 251 | 200 |
| 60% Gelatin, 40% Hydrolysate Solids | 198 | 178 |

It will be noted that the density of the marshmallow product containing hydrolysate-gelatin whipping agent after a 2½ minute whip was approximately equal to or slightly lower than the product containing a pure gelatin whipping agent and subjected to a 3½ minute whipping time. In other words, the hydrolysate-containing product required a very substantially shorter whipping time than a product of equal density having a pure gelatin whipping agent. Sample marshmallows were cast in starch (in a conventional way) from the first batch (all-gelatin agent) at the end of 3½ minutes' whipping, and from the second batch (gelatin-hydrolysate agent) at the end of 2½ minutes' whipping, for comparison of products where the whipped mixtures had almost identical density. Removed from the starch after 24 hours, the marshmallow containing hydrolysate was found to require much less effort to bite through and to require much less stretching before breaking (the property called shortness), than the marshmallow, similarly removed from the starch, which had been made with all-gelatin whipping agent. These properties indicate that the marshmallow with hydrolysate is a significantly more tender product.

*Example III*

Gelatin residue of the type described in Example I above was introduced to an aqueous bath containing sulfuric acid in a proportion of 2% by weight based on the amount of residue treated, and heated as before to effect hydrolysis of the residue. After straining to remove undissolved solids, the resultant hydrolysate liquor was treated with lime to adjust the pH and precipitate the sulfate ion as calcium sulfate, which was removed by filtration after settling. The produced hydrolysate liquor was then blended with 250 bloom gelatin (in solution in water) in varying proportions to provide two whipping agents. Marshmallow mixtures were then prepared from these whipping agents according to the procedure outlined in Example I, and for purposes of comparison another mixture, with a pure gelatin whipping agent, was similarly prepared. Each of these mixtures was whipped for 3½ minutes. The densities of the products thus obtained was as follows.

Whipping agent used:               Net weight per Pint, grams

Pure gelatin _____ 281
    90% gelatin–10% hydrolysate _____ 254
    80% gelatin–20% hydrolysate _____ 234

Again, as indicated in the table, the inclusion of the hydrolysate in the whipping agent substantially improved the whipping properties of the marshmallow mixture and specifically decreased the density of the resultant product as compared with a product prepared with a pure gelatin whipping agent and whipped for an equal period of time.

It is to be understood that the present invention is not limited to the specific procedures and embodiments hereinabove set forth, but may be carried out in other ways without departure from its spirit.

We claim:
1. A method of making marshmallow, comprising:
    hydrolysing gelatin residue, derived from the production of gelatin from bone, pigskin, beefskin and calfskin, in an aqueous bath containing a hydrolysing agent at a temperature of at least about 190° F. and for a time of at least about six hours;
    adjusting the pH of the resultant hydrolysate liquor to a value between 3 and 7 by treatment with neutralizing agent;
    said hydrolysing agent and said neutralizing agent being mutually selected such that the active ion of said hydrolysing agent is removed from said liquor by reaction with said neutralizing agent to form an insoluble salt, which salt precipitates from said hydrolysate liquor;
    blending said hydrolysate liquor with gelatin solution to form a whipping agent containing between about 5% and about 50% hydrolysate solids, based on the total of said solids and gelatin;
    preparing a marshmallow mixture including at least one sugar, water, and an amount of said whipping agent constituting between about 1.5% and about 2.25% of the total weight of said mixture; and
    whipping said mixture to produce a stable air-expanded marshmallow product.
2. A method according to claim 1, wherein the step of hydrolysing said gelatin residue comprises heating said residue in an aqueous bath containing lime in an amount equal to at least about 2% of the weight of said residue; and
    wherein the step of adjusting the pH of said hydrolysate liquor comprises treating said liquor with an acid effective to remove calcium ion from said liquor by formation of an insoluble calcium salt.
3. A method according to claim 2, wherein said acid is sulfuric acid.
4. A method according to claim 2, wherein said acid is phosphoric acid.
5. A method according to claim 1, wherein the step of hydrolysing said gelatin residue comprises heating said residue in an aqueous bath containing sulfuric acid in an amount equal to between about 2% and about 10% of the weight of said residue; and
    wherein the step of adjusting the pH of said hydrolysate liquor comprises treating said liquor with lime to remove sulfate ion from said liquor by formation of calcium sulfate.
6. A method according to claim 1, which includes:
    removing undissolved solids from the hydrolysate liquor after the step of heating said residue with a hydrolysing agent before the pH adjusting step.

References Cited by the Examiner

UNITED STATES PATENTS

| | | | |
|---|---|---|---|
| 2,324,951 | 7/43 | Ratzer | 99—18 |
| 2,520,581 | 8/50 | Turner | 99—134 |
| 2,838,402 | 6/58 | Steigmann | 99—18 X |
| 2,928,822 | 3/60 | Johnsen et al. | 260—118 X |

OTHER REFERENCES

Jacobs: "The Chemistry and Technology of Food and Food Products," 1951, vol. III, Interscience Publishers, Inc., New York, pp. 2281 to 2283.

A. LOUIS MONACELL, *Primary Examiner.*

BEATRICE H. STRIZAK, WILLIAM B. KNIGHT, *Examiners.*